No. 633,959. Patented Sept. 26, 1899.
H. HAWKES.
DEVICE FOR CONNECTING HOUSE SERVICE PIPES WITH WATER MAINS.
(Application filed Apr. 15, 1899.)
(No Model.)

WITNESSES:
Geo. B. Rowley.
Herbert J. Lillie.

INVENTOR
Henry Hawkes
BY
Seymour & Harmon
his ATTORNEYS

UNITED STATES PATENT OFFICE.

HENRY HAWKES, OF NEW YORK, N. Y., ASSIGNOR OF ONE-HALF TO ROBERT VAN BUREN, OF SAME PLACE.

DEVICE FOR CONNECTING HOUSE SERVICE-PIPES WITH WATER-MAINS.

SPECIFICATION forming part of Letters Patent No. 633,959, dated September 26, 1899.

Application filed April 15, 1899. Serial No. 713,079. (No model.)

*To all whom it may concern:*

Be it known that I, HENRY HAWKES, a citizen of the United States, and a resident of New York, (Brooklyn,) in the county of Kings and State of New York, have invented certain new and useful Improvements in Devices for Connecting House Service-Pipes with Water-Mains, of which the following is a specification.

The object of my invention is to produce an improved device by which the house service-pipe can be connected to the water-main.

Figure 1:
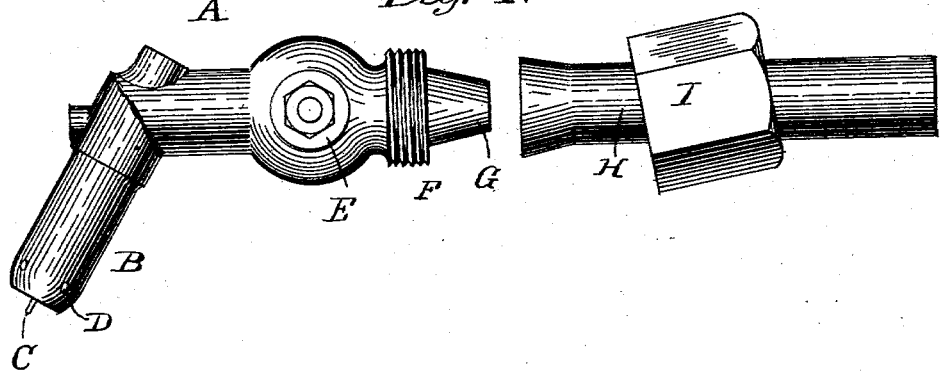
Figure 2:
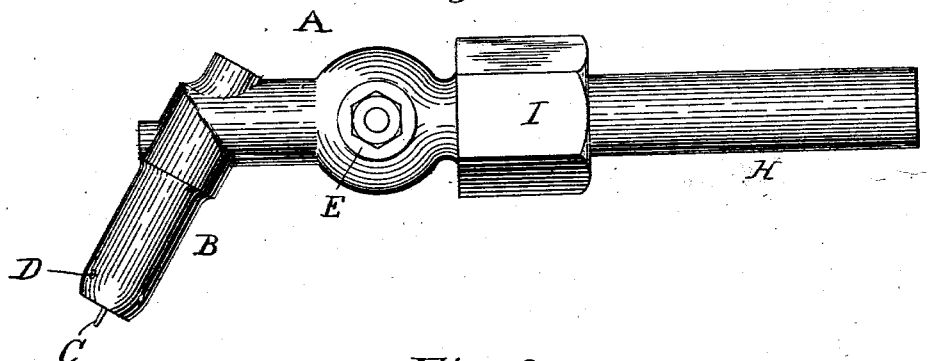
Figure 3:
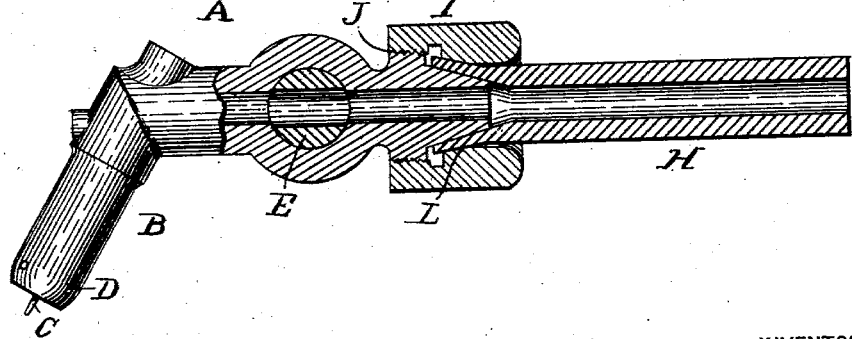

In the drawings forming part of this specification, Figure 1 is a side elevation of the two parts of the coupling detached. Fig. 2 is an elevation of the two parts of the coupling united. Fig. 3 is an elevation of a vertical section, showing the relation of the parts.

The device consists of two parts, one, A, being formed of any suitable metal, such as brass, having at one end a downwardly-projecting part B, which is adapted for connection with the water-main, said part having the guard C and the orifices D. This part extends at nearly a right angle to the other part of the piece A. This part A of the coupling has a valve of any desired form, usually a turning-plug E, and beyond the turning-plug it is screw-threaded, as at F. Beyond the screw-thread extends a conical projection G.

H is the pipe, of lead or soft metal, which carries the water-supply through the house. The end of this pipe is flaring, so as to fit over the conical projection G. The parts are connected by the nut I, which is screw-threaded for a portion of its length, as shown at J, and formed with a conical interior surface, as at L.

In making the connection with my device the water-main is tapped and the part B connected with main in any suitable manner to form a tight joint. The end of the soft-metal house-pipe is then flared by use of a mandrel, or in any suitable manner, the nut having previously been slipped over said pipe, the flared end being placed over the conical projection B. The nut is now screwed onto the threads F, and its interior conical surface bearing against the flared portion of the pipe forces it into contact with the conical projection, thus making a tight joint. By this means I dispense with the use of wiped joints, which in connecting up with a water-main is a very important feature, as the work has generally to be done in excavations where it is difficult to make the proper joint. It often happens in making such joints that the improper running of the solder of which the joint is composed will fill or partly fill the passage through the pipe, thus preventing or retarding the flow of water. It will also be observed that the coupling is extremely simple, consisting of but three parts altogether, thus avoiding the use of extra connecting pieces, sleeves, packing devices, &c. This joint can be quickly and expeditiously made with a minimum expense as to material, time, and labor.

Another advantage is that excavations made for connecting house-pipes to the mains need not be left open over night, as is the case when the services of a skilled plumber are necessary to make a wiped joint. To make the connection with my device, no more than fifteen minutes are required and no skilled labor necessary, so that the excavation need not remain open, which is of great advantage, as it removes the danger of accidents now so common in large cities.

What I claim, and desire to secure by Letters Patent, is—

A tap for water-mains consisting of a metal piece having at one end a downward projection for connection with the main, a valve in said piece, the other end of said piece having a screw-threaded portion, a conical projection beyond said screw-threaded portion, and a nut having a portion of its interior formed cone-shaped to correspond with the conical projection, whereby the soft-metal house-pipe may be connected directly to said tap without the necessity for wiped or packed joints, substantially as described.

Signed at New York, in the county of New York and State of New York, this 13th day of April, A. D. 1899.

HENRY HAWKES.

Witnesses:
E. M. HARMON,
F. B. KAIN.